Figure 1:
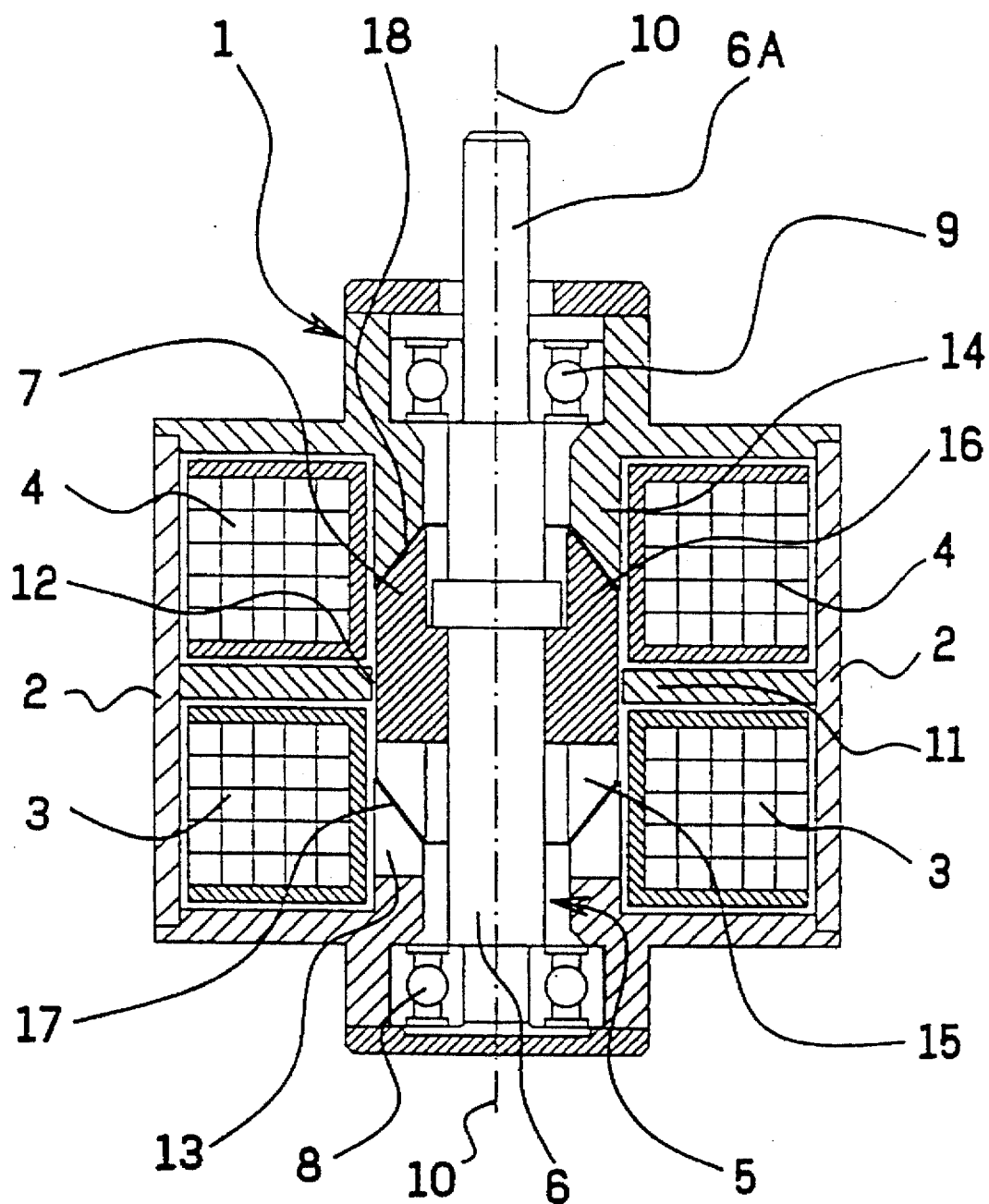

United States Patent
Covelli et al.

[11] Patent Number: 5,699,031
[45] Date of Patent: Dec. 16, 1997

[54] ELECTROMAGNETIC ACTUATOR WITH ROTARY CORE

[75] Inventors: Marco Covelli, Occhieppo Inferiore; Enzo Dandolo, Sagliano Micca, both of Italy

[73] Assignee: Nuova Roj Electrotex S.r.l., Biella, Italy

[21] Appl. No.: 569,077
[22] PCT Filed: Jun. 1, 1994
[86] PCT No.: PCT/EP94/01785
§ 371 Date: Dec. 4, 1995
§ 102(e) Date: Dec. 4, 1995
[87] PCT Pub. No.: WO94/29945
PCT Pub. Date: Dec. 22, 1994

[30] Foreign Application Priority Data

Jun. 3, 1993 [IT] Italy .................. MI93A1169

[51] Int. Cl.$^6$ ........................ H01F 7/08
[52] U.S. Cl. .............. 335/272; 335/177; 310/266
[58] Field of Search ............. 335/177–9, 270–4; 310/266–68

[56] References Cited

U.S. PATENT DOCUMENTS 2,343,325  3/1944  Ranseen.
3,201,670  8/1965  Myers.
3,248,499  4/1966  Young ...................... 335/179
5,337,030  8/1994  Mohler .................... 310/154

FOREIGN PATENT DOCUMENTS 648 446  5/1964  France.
617591   2/1949  United Kingdom.

*Primary Examiner*—Lincoln Donovan
*Attorney, Agent, or Firm*—Young & Thompson

[57] ABSTRACT

Electromagnetic actuator with rotary core, comprising, housed in a casing: a magnetic yoke, a pair of fixed adjacent coils alternately energized, and a rotating element with a magnetic core; the yoke, the coils and the core having a common axis coinciding with that of the actuator, and the core being positioned between and/or within said coils, so as to close alternative circuits of magnetic flux, generated in the yoke by either one of the coils, between opposite axial pole pieces and central radial pole pieces of the yoke. In the actuator: the yoke (2) comprises a single radial pole piece (11) common to both coils (3, 4) and two sets of axial end pole pieces (13, 14). The core (7) comprises a continuous central part magnetically cooperating with the radial piece (11) of the yoke (2) and the two opposite sets of pole pieces (15, 16) axially projecting from the central part and magnetically cooperating with the sets of axial pole pieces (13, 14) of the yoke (2); in the two sets of pole pieces (15, 16) of the core (7), or alternatively in the two sets (13, 14) of the yoke (2), the pole pieces of one set are offset in respect of the pole pieces of the other set.

5 Claims, 3 Drawing Sheets

ELECTROMAGNETIC ACTUATOR WITH ROTARY CORE

The present invention concerns an electromagnetic actuator with rotary core, the rotation of which is controlled directly by the magnetic field.

As known, it is always more widespread in the technique applied to the construction of plants and machines to use actuators, namely devices—electromagnetic, pneumatic, oledionamic—adapted to produce small linear or angular movements of component parts of said plants and machines.

The fundamental characteristic of an actuator is the capability to impart, simultaneously with the motion of a movable element thereof, a thrusting and/or drawing force in the case of the linear type of actuator, or a torque in the case of an angular type of actuator.

The most widespread use of actuators is made of in servomechanisms since there is in fact a great advantage—compared to other operating systems—in being able to produce the motion where it is directly required, without having to derive it with kinematic mechanisms from a central motion source.

Among the known actuators, use is particularly made of the electrically operated ones, usually defined as electromagnetic actuators or, in short, as electromagnets.

Obviously, also in the field of electromagnetic actuators there are two types of movements, linear or angular, adapted to be imparted therewith.

In the case of a linear movement, the movable element of the electromagnet (or movable core) performs a motion along a rectilinear trajectory, under the action of a magnetic field obtained by suitably energizing one or more coils.

In the case of an angular movement, the movable core of the electromagnet performs a rotary motion about its own axis, under the action of a suitable magnetic field.

The technique to produce electromagnets with a linear movement of the movable element has greatly evolved during the past years, and a great number of modifications have been introduced to improve the product so as to be able to obtain more and more advanced performances.

Definitely less evolved is the technique to produce electromagnets wherein the movable core performs a rotary motion about its on axis, or "electromagnets with rotary core". In fact, the examples of construction of electromagnets with rotary core are positively few, since it is usually preferred—as far as can be reckoned from the proposals of the constructors—to resort to electromagnets, wherein the rectilinear movement of the movable core is turned into a rotary motion by mechanical means.

A clear example is represented by the solution proposed by various constructors according to which, even though the coils generate a force along the axis of the electromagnet, which thus tends to move the movable core along this trajectory said core then performs a rotary motion thanks to a torque imparted thereto as a result of its motion.

In fact, in said actuators, a movable cylindrical core carries at one end a disc flange fixed thereto, which faces a circular flat zone of the fixed par of the electromagnet. Between the disc of the movable core and the circular zone of the fixed par there are interposed some balls engaging into grooves which extend into a circle arc, said grooves being formed on the two facing zones in such a way that, when the electromagnet is energized, the magnetic force induced in the movable core in an axial sense generates, at the points of contact with the balls, a component perpendicular to the radius and creates a torque acting on the movable core.

In this way, the movable core performs a rotary motion simultaneously with its axial movement.

As can be easily understood, this is a very rough solution which prejudices the speed of the electromagnet, due to the considerable inertias of the movable core and the significant frictions being produced between the various parts.

Said solution is therefore not adapted to solve the great number of problems arising in present technique, especially when the times of response of the actuators have to be very short and said actuators have to perform a large number of consecutive operations.

The present invention now proposes to solve these problems and to satisfy the present requirements in the field of rotating electromagnetic actuators, by supplying an actuator of this type wherein the rotary core is caused to rotate directly by the magnetic field generated by the coils of the actuator, without the interposition of any type of mechanisms, with great advantages as far as simplicity of construction, reliability and the overall performances of the actuator itself.

It is of course already known to cause electromagnetically the rotation of a core about its axis: this in fact takes place in all the electric rotary motors, which are besides foreseen to impart to the core and its shaft a long rotation of a high number of revolutions (often producing high or very high power), and not the short and precise movements meant to be performed by the actuators (with minimum power requirements).

Among the electric rotary motors having characteristics closest to those of the actuators, mention should be made of the "step-by-step" electric motors, which are adapted to perform rotations of limited or very limited amplitude, in both directions, often even repeated several times.

An electric rotary motor of this type, defined as electric impulse motor, is known from U.S. Pat. No. 2,343,325. This is most likely one of the first examples of "step-by-step" electric motors. Said motor comprises—housed in a casing—a magnetic yoke, a pair of fixed adjacent coils alternately energized, and a core rotating on an axis common to the coils and being positioned between them, so as to close alternative magnetic circuits—generated by the energized coil—between opposite axial pole pieces and central radial pole pieces of said yoke.

Said motor structure is however by no means suited to form an electromagnetic actuator adapted to satisfy the present requirements, both from the technical and from the commercial point of view. As well as being scarcely compact and quite complicated as far as construction, the motor of U.S. Pat. No. 2,343,325 like any other "step-by-step" motor:

- is not adapted to simultaneously impart a high torque and a high acceleration, as is indispensable in actuators ("step-by-step" motors supply in fact a limited torque when allowing high accelerations, and viceversa);
- to be used as an actuator it would require costly and complicated electronic pilot systems, especially if high accelerations are needed (whereas, actuators have to be as simple as possible, reliable and economic);
- it involves the risk of an easy loss of synchronism (especially if caused to operate with high torques and accelerations), this drawback being incompatible with the functions of an actuator.

All these drawbacks are instead fully overcome in the actuator of the present invention, which provides furthermore all the advantages of actuators with rotary core.

Said actuator—which essentially comprises, housed in a casing, a magnetic yoke, a pair of fixed adjacent coils alternately energized, and a rotating element with magnetic core, the yoke, the coils and the core having a common axis coinciding with that of the actuator, and the core being positioned between and/or within said coils, so as to close alternative circuits of magnetic flux, generated in the yoke by either one of said coils, between opposite axial pole pieces and central radial pole pieces of said yoke—is characterized in that: the yoke comprises a single radial pole piece, common to both coils, and two sets of axial end pole pieces; the core comprises a continuous central part, magnetically cooperating with the radial pole piece of the yoke, and two opposite sets of pole pieces axially projecting from said central part and magnetically cooperating with said sets of axial pole pieces of the yoke; in the two sets of pole pieces of said core, or alternatively of said yoke, the pole pieces of one set are offset in respect of those of the other set.

In this actuator, said sets of pole pieces of the yoke and of the core comprise an equal number of uniformly distributed pole pieces, means being provided to prevent a perfect contraposition of the pole pieces of the yoke with the pole pieces of the core.

Furthermore, the magnetic gap between the single central pole piece of the yoke and the core of the actuator preferably extends along a cylindrical surface, while the magnetic gaps between the end pole pieces of the yoke and those of the core magnetically cooperating therewith extend along opposed conical surfaces, said cylindrical surface and said conical surfaces having their axis coinciding with that of the actuator.

Means can also be suitably provided to limit the angular rotation of the core.

Figure 2:
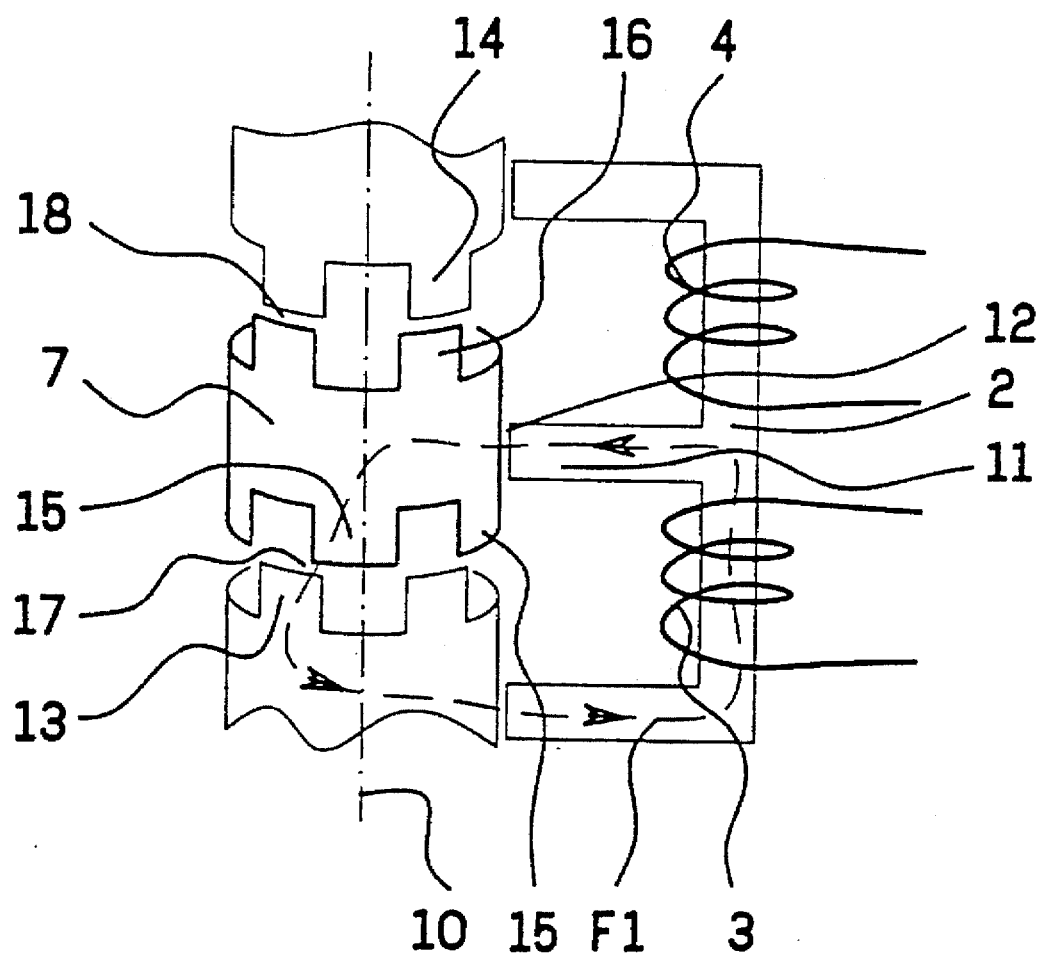
Figure 3:
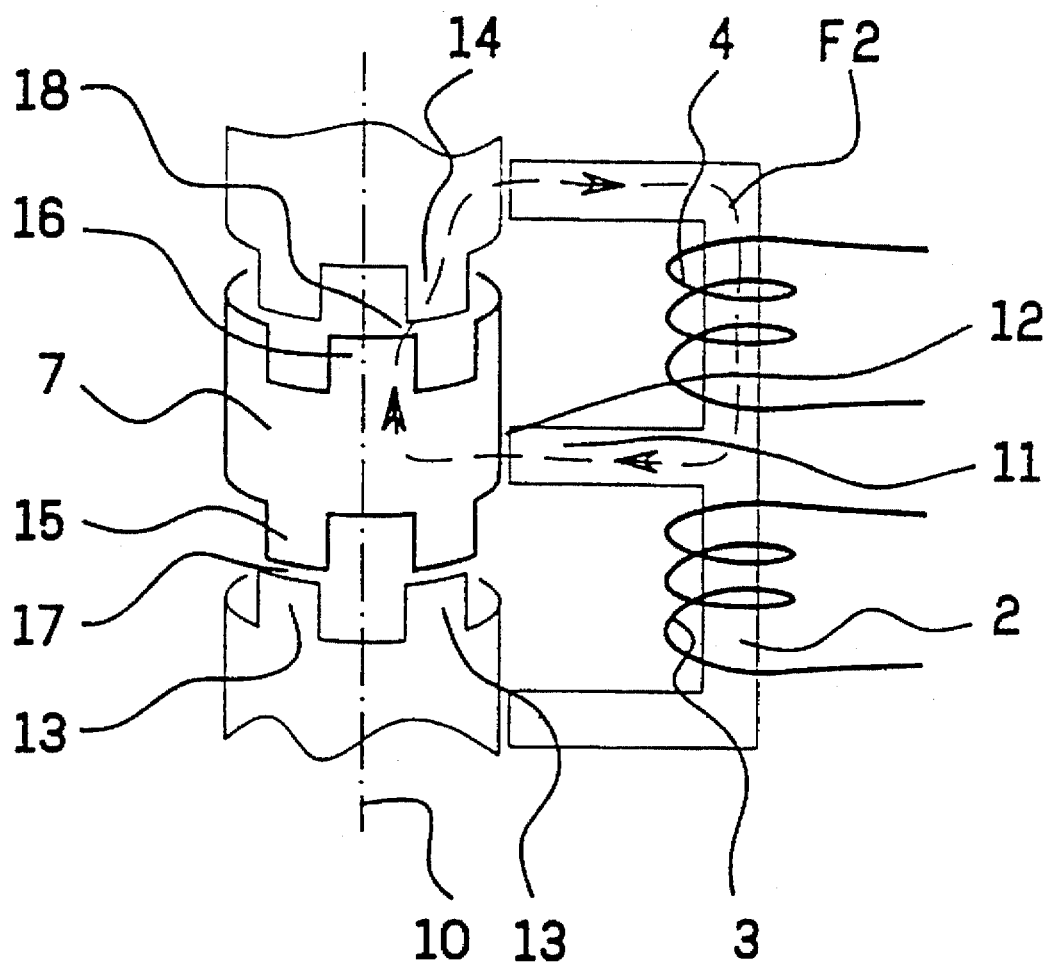

The invention will now be described in further detail, by mere way of example, with reference to a preferred embodiment thereof, illustrated on the accompanying drawings, in which:

FIG. 1 is a diagrammatic axial section view of the electromagnetic actuator according to invention; and FIGS. 2 and 3 are diagrams illustrating the working principle of the actuator shown in FIG. 1.

As shown on the drawings, the electromagnetic actuator of the present invention comprises a casing 1, which incorporates a magnetic yoke 2 and houses two fixed adjacent coils 3, 4, and a movable element 5 formed by a shaft 6 of non-magnetic material and by a magnetic core 7. The shaft 6, projecting with an end 6A from the casing 1, is mounted therein on two roller bearings 8, 9, so that the movable element 5 is free to rotate about an axis 10 common to said shaft, to the yoke 2 and to the coils 3, 4 (axis of the actuator).

The magnetic yoke 2 surrounds the coils 3, 4, and comprises, a single central radial pole piece 11, common to both coils and magnetically cooperating with the central continuous part of the core 7 by way of a magnetic gap 12 of constant width, which extends along a cylindrical surface whose axis coincides with the axis 10 of the actuator; and two sets of axial end pole pieces 13, 14 flux linked only with the coil 3 and with the coil 4 respectively, and facing each other (see especially FIGS. 2 and 3) along the axis 10. An equal number of uniformly distributed axial pole pieces 13, 14, is provided in the two sets.

Also the magnetic core 7 of the movable element 5 comprises two sets of pole pieces 15, 16, which axially project from its continuous central part and are designed to magnetically cooperate with said sets of facing pole pieces 13, 14, of the yoke 2. Also in this case, an equal number of uniformly distributed pole pieces 15, 16, is provided in the two sets. Furthermore, their number is equal to that of the sets of pole pieces 13, 14, of the yoke 2.

In the embodiment shown, the yoke 2 and the core 7 of the movable element 5 are configured so that their pole pieces are substantially in contraposition—as clearly shown in FIG. 1—forming magnetic gaps 17, 18, which extend along opposed conical surfaces with axes coinciding with the axis 10 of the actuator.

According to the invention, either in the yoke 2 or in the core 7 the pole pieces of one set are offset in respect of those of the other set. For example, in the embodiment shown, the pole pieces 15 of the core 7 are offset—see FIGS. 2 and 3—in respect of the pole pieces 16, while in the yoke 2 the pole pieces 14 are almost exactly opposite to the pole pieces 13.

To operate the actuator of the invention, the coils 3 and 4 are alternately energized and the magnetic flux, generated by only one of said coils at a time, passes through alternative magnetic circuits which are closed by the rotary core 7 between the central radial pole piece 11 and, alternately, the axial pole pieces 13, 14, of the yoke 2.

With an actuator like the one described heretofore, in rest conditions—according to FIG. 2—the energizing of the coil 3 produces the magnetic flux F1 (FIG. 2). For the magnetic circuit crossed by said flux to take up the configuration of less resistance, the pole pieces 15 of the core 7 should move exactly in correspondence of the pole pieces 13 of the yoke 2: this is actually obtained by a rotation of the movable element 5, which is just the effect meant to be produced.

From the position thus reached—shown in FIG. 3, with reference to the core 7—the movable element can be caused to rotate in a direction opposite to the previous one and can be moved back to its initial rest condition by energizing the coil 4. In fact, in so doing, one generates a flux F2 (FIG. 3) which linking with the pole pieces 14 of the yoke 2 and 16 of the core 7, which are now offset, moves back said pole pieces one in front of the other by rotating the element 5 in a direction opposite to the previous one.

Structural expedients—such as a suitable, slight, reciprocal displacement of the pole pieces which are not offset (13 and 14)—favour the rotation only in one sense, while the angular rotation can be limited by adopting mechanical stops (not shown). Moreover, in the actuator according to the invention, the number of facing pole pieces of the yoke and of the core determines the angular step and, consequently, the width of the rotation angle of the movable element.

The actuator of the present invention can be used in a wide number and range of industrial applications; it is however particularly suited in all those cases in which the actuator is required to perform very fast operations, with limited movements, and must also be of reduced dimensions. A typical example of this type of application—not meant however to limit the scope of the present invention—is the control of devices to recover the tension of the weft yarn being fed to looms.

It is understood that the aforedescribed embodiment of the actuator according to the invention is merely an example and in no way limits the possibilities to realize other embodiments thereof by introducing modifications and variants: in particular, use could be made of two coils of different characteristics, in the event that the rotation of the movable element in one sense should require more power than its rotation in the opposite sense. Also more than one pair of coils could be provided, and one could vary the shape and mechanical characteristics of the movable element, as well as its mounting, or the shape and characteristics of the sets of cooperating pole pieces, and—obviously—their number.

We claim:

1. In an electromagnetic actuator with rotary core, comprising, housed in a casing: a magnetic yoke (2) having a central radial pole piece (11) and two sets of opposite axial end pole pieces (13, 14), a pair of fixed adjacent coils (3, 4) alternately energized, and a rotating element with a magnetic core (7); the yoke (2), the coils (3, 4) and the core (7) having a common axis, the central radial pole piece of the yoke (2) consisting of a single pole piece (11) common to both coils (3, 4) and the core (7) being adapted to close alternative circuits (F1, F2) of magnetic flux generated in the yoke (2) by either one of said coils (3, 4) between said opposite axial end pole pieces (13, 14) and said central radial pole piece (11) of the yoke (2); the improvement wherein the core (7) comprises a continuous central part magnetically cooperating with the central radial pole piece (11) of the yoke (2) and the opposite sets of pole pieces (15, 16) axially projecting from said continuous central part and magnetically cooperating with said sets of opposite axial end pole pieces (13, 14) of the yoke (2); and in the two sets of pole pieces (15, 16) of said core (7), or alternatively in the two sets (13, 14) of said yoke (2), the pole pieces of one set are offset in respect of the pole pieces of the other set.

2. An electromagnetic actuator as claimed in claim 1, wherein said sets of pole pieces (13, 14) of the yoke (2) and said sets of pole pieces (15, 16) of the core (7) comprise an equal number of uniformly distributed pole pieces, means being provided to prevent a perfect contraposition of the pole pieces of the yoke with the pole pieces of the core.

3. An electromagnetic actuator as claimed in claim 1, wherein the magnetic gap (12) between the single central pole piece (11) of the yoke (2) and the core (7) extends along a cylindrical surface, while the magnetic gaps (17, 18) between the end pole pieces (13, 14) of the yoke and those (15, 16) of the core magnetically cooperating therewith extend along opposed conical surfaces, said cylindrical surface and said conical surfaces having their axis coinciding with the axis (10) of the actuator.

4. An electromagnetic actuator as claimed in claim 1, wherein means are provided to limit the angular rotation of the core (7).

5. An electromagnetic actuator as claimed in claim 1, each said set of opposite axial and pole pieces comprising a plurality of pole pieces.

* * * * *